(12) United States Patent
Mitchell

(10) Patent No.: US 11,323,445 B2
(45) Date of Patent: May 3, 2022

(54) METHODS AND SYSTEMS FOR ACCESSING A NETWORK

(71) Applicant: BlackBerry Limited, Waterloo (CA)

(72) Inventor: Robert Scott Mitchell, Kitchener (CA)

(73) Assignee: BlackBerry Limited, Waterloo (CA)

( * ) Notice: Subject to any disclaimer, the term of this patent is extended or adjusted under 35 U.S.C. 154(b) by 168 days.

(21) Appl. No.: 16/701,329

(22) Filed: Dec. 3, 2019

(65) Prior Publication Data
US 2021/0168143 A1 Jun. 3, 2021

(51) Int. Cl.
| | | |
|---|---|---|
| *H04L 67/12* | (2022.01) | |
| *H04L 67/141* | (2022.01) | |
| *G16Y 30/10* | (2020.01) | |
| *G16Y 40/50* | (2020.01) | |
| *H04L 29/06* | (2006.01) | |

(52) U.S. Cl.
CPC ............ *H04L 63/10* (2013.01); *H04L 67/12* (2013.01); *H04L 67/141* (2013.01); *G16Y 30/10* (2020.01); *G16Y 40/50* (2020.01)

(58) Field of Classification Search
CPC ....... H04L 63/10; H04L 67/12; H04L 67/141; H04L 63/20; H04L 63/105; H04L 29/06823; H04L 63/108; G16Y 30/10; G16Y 40/50; H04W 12/37; H04W 12/66; H04W 12/67; G06F 21/577
See application file for complete search history.

(56) References Cited

U.S. PATENT DOCUMENTS

| | | | | |
|---|---|---|---|---|
| 8,549,617 | B2 * | 10/2013 | Wei ...................... | H04W 12/068 |
| | | | | 726/15 |
| 9,432,361 | B2 * | 8/2016 | Mahaffey ................ | H04L 63/18 |
| 9,560,015 | B1 * | 1/2017 | Glazemakers ........ | H04L 63/029 |
| 11,017,069 | B2 * | 5/2021 | Robinson .............. | H04W 12/06 |
| 2007/0070958 | A1 * | 3/2007 | Rinne ..................... | H04L 63/08 |
| | | | | 370/338 |
| 2014/0006347 | A1 * | 1/2014 | Qureshi ................ | H04L 9/0822 |
| | | | | 707/621 |
| 2014/0108793 | A1 * | 4/2014 | Barton .................. | H04W 12/06 |
| | | | | 713/165 |
| 2014/0109174 | A1 * | 4/2014 | Barton ................ | H04L 63/0272 |
| | | | | 726/1 |
| 2014/0109175 | A1 * | 4/2014 | Barton ................ | H04L 63/0272 |
| | | | | 726/1 |
| 2014/0122702 | A1 * | 5/2014 | Jung .................... | H04L 43/0876 |
| | | | | 709/224 |
| 2014/0282877 | A1 * | 9/2014 | Mahaffey .............. | H04W 12/08 |
| | | | | 726/3 |
| 2014/0282957 | A1 * | 9/2014 | Thakore .............. | H04L 63/0272 |
| | | | | 726/7 |

(Continued)

OTHER PUBLICATIONS

Extended European Search Report, EP Application No. 20210802.3 dated Apr. 14, 2021.

*Primary Examiner* — David R Lazaro
(74) *Attorney, Agent, or Firm* — Rowand LLP

(57) ABSTRACT

A method of accessing a network comprises providing, via a first container establishing a first tunnel between a computing device and a network server, a health-check status of the computing device to the network server, and accessing, via a second container establishing a second tunnel between the computing device and the network server, the network at a level of access based on the health-check status of the computing device.

18 Claims, 6 Drawing Sheets

(56) References Cited

U.S. PATENT DOCUMENTS

| | | | |
|---|---|---|---|
| 2015/0058916 A1 | 2/2015 | Rostami-Hesarsorkh et al. | |
| 2017/0169249 A1* | 6/2017 | de Oliveira | H04L 67/10 |
| 2017/0329963 A1* | 11/2017 | Zhai | G06F 21/602 |
| 2018/0139241 A1 | 5/2018 | Jacobsen | |
| 2019/0286806 A1* | 9/2019 | Robinson | H04W 12/64 |
| 2019/0318107 A1* | 10/2019 | Capone | G06F 16/152 |
| 2021/0103477 A1* | 4/2021 | McClymont | G06F 9/5077 |
| 2021/0168143 A1* | 6/2021 | Mitchell | H04L 63/20 |
| 2021/0185012 A1* | 6/2021 | Kochhar | H04L 63/0272 |

\* cited by examiner

METHODS AND SYSTEMS FOR ACCESSING A NETWORK

FIELD

The present application generally relates to network security, and more particularly, to providing access to a network.

BACKGROUND

Computing devices often request access to a network. In bring-your-own device (BYOD) environments or internet of things (IOT) environments, unknown or untrusted computing devices may pose a risk to the network. For example, computing devices may not be fully patched, may not have up-to-date antivirus software, unmodified anti-malware software, or may have other indicators that could compromise the network.

It would be advantageous to be able to safely evaluate the health of a computing device before allowing the computing device to access the network.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
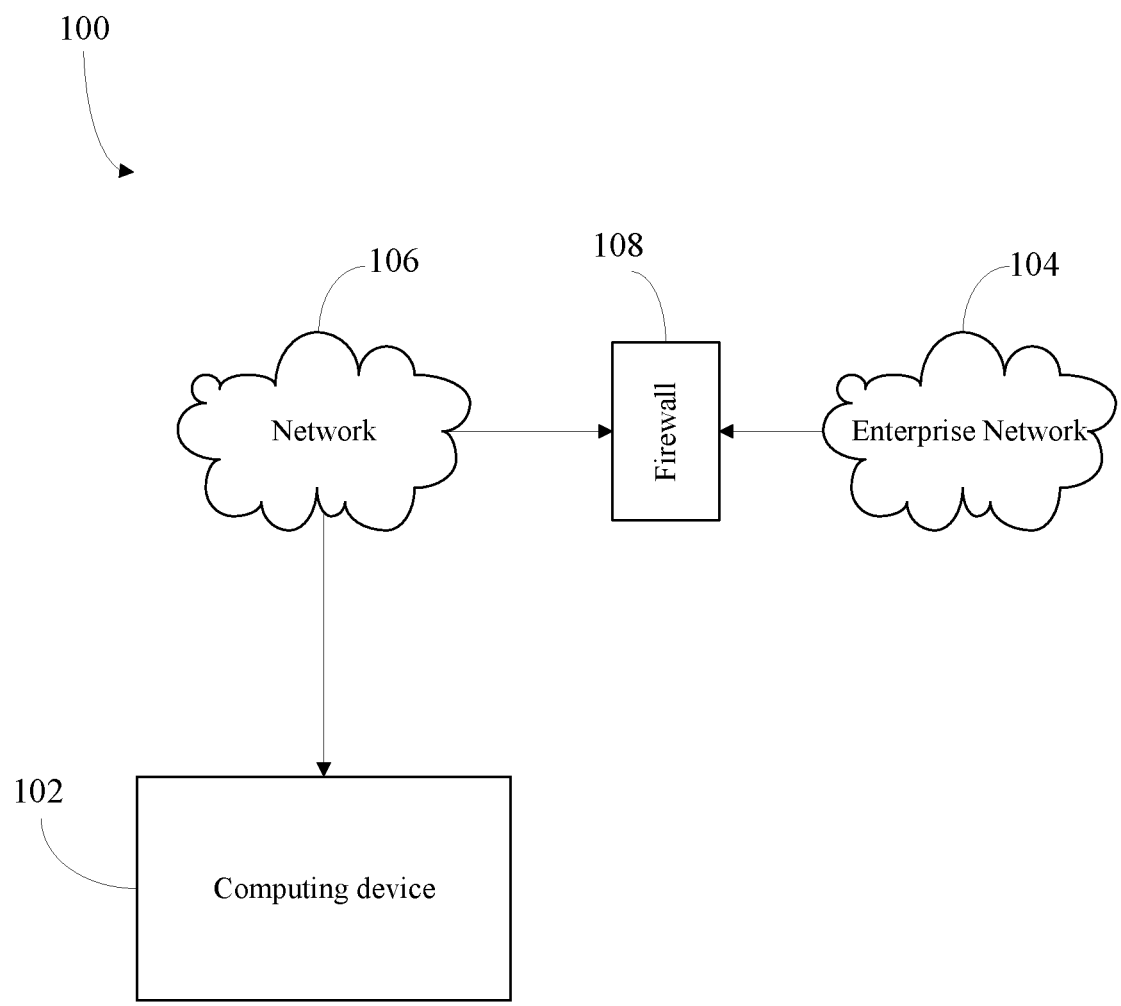
FIG. 1 shows an example system in which methods and devices in accordance with the present description may be implemented.

In a first aspect, the present application describes a method of accessing a network. The method comprises providing, via a first container establishing a first tunnel between a computing device and a network server, a health-check status of the computing device to the network server; and accessing, via a second container establishing a second tunnel between the computing device and the network server, the network at a level of access based on the health-check status of the computing device.

In one or more embodiment, the method comprises determining, at the network server, the level of access to the network based on the provided health-check status.

In one or more embodiments, the first and second containers are segregated within memory of the computing device.

In one or more embodiment, the method comprises repeating the step of providing at a predefined interval; and updating the level of access if the health-check status of the computing device changes.

In one or more embodiments, the method comprises sending, to the network server, a request to access the network.

In one or more embodiments, the method comprises downloading, from the network server, the first and second containers into memory of the computing device.

In one or more embodiments, the method comprises receiving a download link from the network server that, when selected, downloads the first and second containers into memory of the computing device.

In one or more embodiments, the health-check status of the computing device is one of pass, partial pass and fail.

In one or more embodiments, the level is one of full access, limited access and no access based on an access profile for the user of the computing device.

In one or more embodiments, the level is set to full access when the health-check status of the computing device is pass. The level is set to limited access when the health-check status of the computing device is partial pass. The level is set to limited access when the health-check status of the computing device is partial pass.

In one or more embodiments, the first container has read-only access of the computing device.

In one or more embodiments, the second container has a minimum default access to the network.

In another aspect, the present application describes a computing device comprising a processor; a memory; and processor-executable instructions that, when executed by the processor, cause the processor to provide, via a first container stored in the memory and establishing a first tunnel between the computing device and a network server, a health-check status of the computing device to the network server; and access, via a second container stored in the memory and establishing a second tunnel between the computing device and the network server, a network at a level of access based on the health-check status of the computing device.

In one or more embodiments, the first and second containers are segregated within the memory.

In one or more embodiments, the processor-executable instructions, when executed by the processor, cause the processor to repeat the step of providing at a predefined interval; and update the level of access if the health-check status of the computing device changes.

In one or more embodiments, the health-check status of the computing device is one of pass, partial pass and fail.

In one or more embodiments, the level is one of full access, limited access and no access based on an access profile for the user of the computing device.

In another aspect the present application describes a non-transitory computer-readable storage medium storing processor-executable instructions that, when executed by a processor, cause the processor to provide, via a first container establishing a first tunnel between the computing device and a network server, a health-check status of a computing device to the network server; and access, via a second container establishing a second tunnel between the computing device and the network server, a network at a level of access based on the health-check status of the computing device.

In another aspect, the present application describes a method of providing access to a network. The method comprises receiving, at a server, a health-check status of a computing device, the health-check status received from a first container stored in memory of the computing device and establishing a first tunnel between the computing device and the server, determining a level of access to the network to provide to the computing device based on the health-status, and providing a second container stored in memory of the computing device access to the network at the determined level, the access provided through a second tunnel connection established between the computing device and the server.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, reference is made to a "tunnel" or a "tunnel connection". A tunnel is an encrypted connection across the Internet. In a tunnel, data is broken into smaller pieces called packets as they move along the tunnel for transport. As the packets move through the tunnel, they are encrypted and encapsulation occurs. Private network data and protocol information that goes with it are encapsulated in public network transmission units for sending. The unit looks like public data, allowing it to be transmitted across the Internet. Encapsulation allows the packets to arrive at their proper destination. At the final destination, de-capsulation and decryption occur. Tunnels allow for communication to be conducted over a private network but tunneled through a public network.

Although many of the example computing devices described below and discussed below are mobile devices, such as smartphones, tablets, and laptops, the present application is not limited to mobile devices and may be implemented in connection with non-mobile devices. Further, the example computing devices may be IoT devices. The example computing devices may be endpoints and/or intermediate gateways.

In the present application, reference is made to a "container". A container is a unit of software that packages up code and all its dependencies. A container may comprise an executable package of software that includes everything needed to run an application such as for example code, runtime, system tools, system libraries and settings. Containers isolate software from its environment and ensure that it works uniformly despite differences for example between development and staging. When installed on a computing device, a container may be isolated such that it may not be accessed and may not communicate with other containers installed on the same computing device. A container may be encrypted. As will be appreciated, a container may be unique and specific to the computing device installed thereon.

In some cases, resources on the computing devices, including mobile devices or other computing systems, are segmented into different containers to manage access to these resources. For example, a computing device can have one or more personal containers for a user's personal data and applications. The computing device can also have one or more enterprise containers for a user's enterprise data and applications. Using containers to manage resources on a computing device can help enterprises reduce the risk that enterprise resources may be accessed by, for example, malicious or vulnerable applications. In some cases, a container can be referred to as a "profile," a "perimeter," or a "workspace."

In general, containers can be implemented as groups of resources having a common management scheme, where each container generally includes one or more resources and one or more policies regarding use of or access to the one or more resources. Containers can be implemented on data communication systems that include a computing device and can be used to logically separate resources, e.g., files, applications, network connections, data, on the device. For example, the computing device can implement two or more containers, which can include one or more personal containers, one or more enterprise containers, or a combination of these and other types of containers. A personal container can be managed by a device user, and an enterprise container can be managed by an enterprise or corporate administrator, e.g., using an enterprise mobility management (EMM) server.

In some implementations, each container on a computing device (e.g., enterprise or personal) has its own file system, and separation between containers can be provided, at least partially, by the separation of the file systems on the computing device. In some cases, some of the resources of each container (e.g., data and policies) are stored in a dedicated file system for the container, while other resources of each container (e.g., applications) are stored outside of the dedicated file system.

Separation of file systems can be logical, physical, or both. A physical separation of file systems can be implemented, for example, by designating physically separate memory locations (e.g., separate memory devices or separate blocks in the same memory) for each file system. A logical separation of file systems can be implemented, for example, by designating logically separate data structures (e.g., separate directories) for each file system. In some implementations, each file system has its own encryption parameters. For example, the file system for an enterprise container can have its own encryption key and a higher encryption strength, while a file system for a personal container can have its own encryption key and lower encryption strength. In some instances, the file system for the personal container has the same encryption strength as the enterprise container, or the file system for the personal container can be unencrypted.

Many organizations have gravitated to a bring-your-own-device (BYOD) model for staff computing devices. To facilitate this model, many organizations use an enterprise mobility management (EMM) server to exercise enterprise control over computing devices and resources that may be accessed by computing devices. In general, the EMM may govern the ability of computing devices to access an enterprise network and may enable the enterprise to push device policies and security policies to the computing devices. In many cases, the model is mixed and involves some computing devices brought to the enterprise under a BYOD policy and some computing devices, particularly enterprise desktops, laptops, and other such computing devices, that are enterprise-owned but are in the possession and control of staff users. The security of both these types of computing devices is of concern to enterprises and to users. The EMM may include one or more Unified Endpoint Management (UEM) servers that may utilize enterprise containers to provide secure access to an enterprise network.

Turning now to FIG. 1, a system is shown and is generally identified by reference numeral 100. The system 100 comprises a computing device 102 and an enterprise network 104. The computing device 102 is configured to communicate with the enterprise network 104 via a computer network 106. The computer network 106 may include wired networks, wireless networks, or combinations thereof, and may include the Internet. The enterprise network 104 may include security mechanisms regulating access and traffic between the enterprise network 104 and the computer network 106, represented generally as a firewall 108. In this embodiment, the computing device 102 may be a mobile device, such as a smartphone, smartwatch, laptop, tablet, wearable, or other such device.

Figure 2:
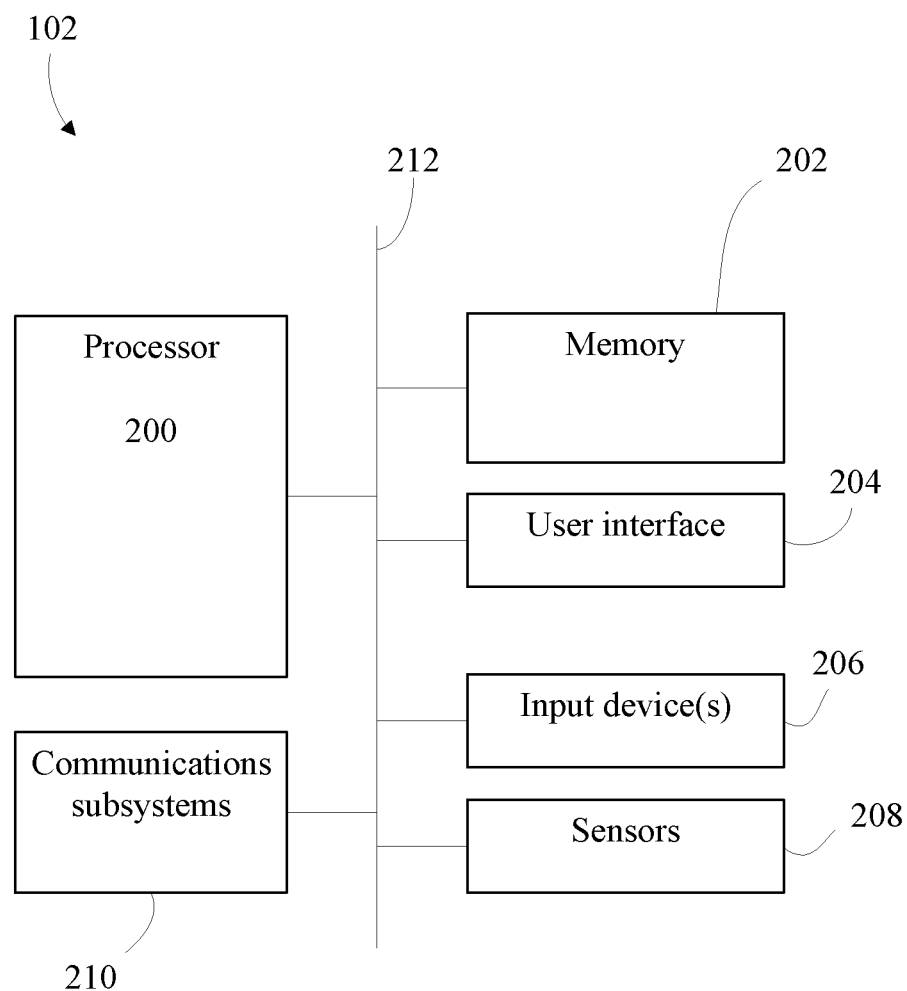
FIG. 2 shows, in block diagram form, a simplified example of a computing device.

The computing device 102 is shown in FIG. 2. As can be seen, the computing device 102 includes a processor 200, memory 202, a user interface 204, one or more input devices 206, sensor 208, communication subsystems 210 and a bus 212 coupling the various components together. The memory 202 may include temporary memory and persistent memory. The user interface 204 may include a display screen in many embodiments, but may also include other sensory output devices including a speaker, vibratory mechanism, e-ink display, or other such devices. It will be appreciated that in some embodiments the computing device 102 may not have a user interface. The input devices 206 and sensors 208 may include a touch-sensitive input device like a touchscreen, a keyboard, a keypad, a camera, a microphone, a gyroscope, an accelerometer, and various other input mechanisms. The communications subsystems 210 enable wired or wireless communication with other computing devices. Example communication subsystems 210 include a cellular system for data and/or voice communication over a cellular network, including 3G, 4G or 5G networks, a WiFi chip for data connection with a wireless local area network (WLAN), a short-range wireless system like a Bluetooth™ chip, a near-field communications (NFC) chip, an Ethernet port, or any other communications systems operating in accordance with any applicable communications protocol. As will be appreciated, the computing device 102 may be a computing device owned by the enterprise or owned by a staff member of the enterprise and associated through a BYOD program. The computing device 102 may be remotely located from the enterprise network.

Figure 3:
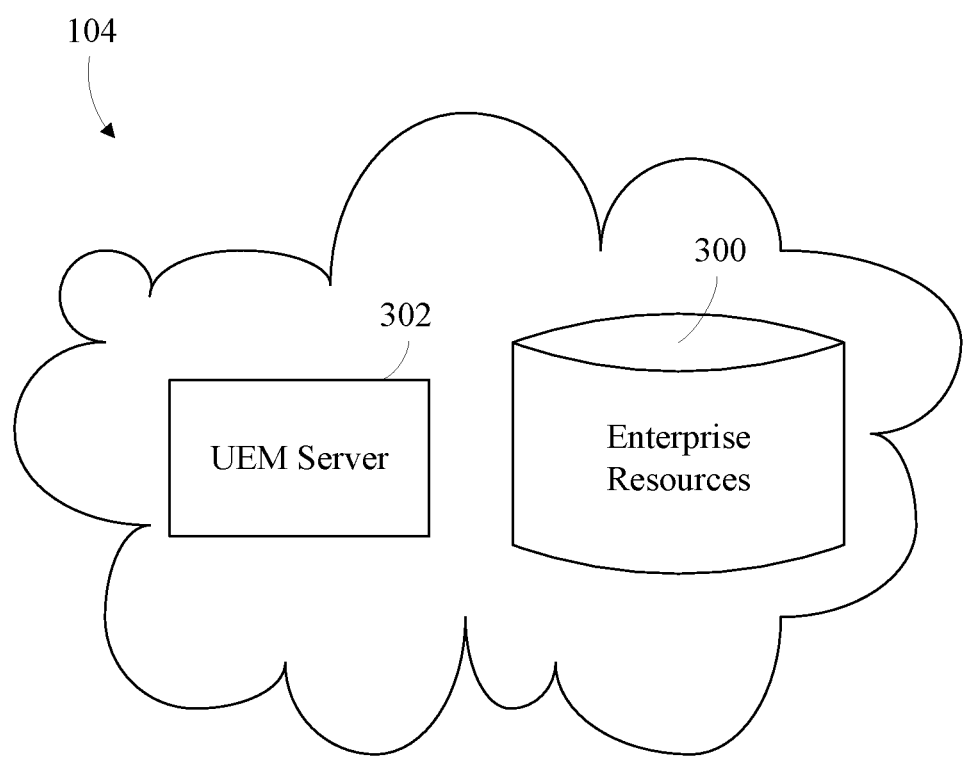
FIG. 3 shows an example of an enterprise network.

The enterprise network 104 is shown in FIG. 3. In this embodiment, the enterprise network 104 comprises enterprise resources 300 and a unified endpoint management (UEM) server 302.

The enterprise resources 300 may include one or more servers, including application servers, web servers, databases or other such resources. The enterprise resources 300 may also include data resources, such as media libraries, file repositories, app databases, or other such resources.

Figure 4:
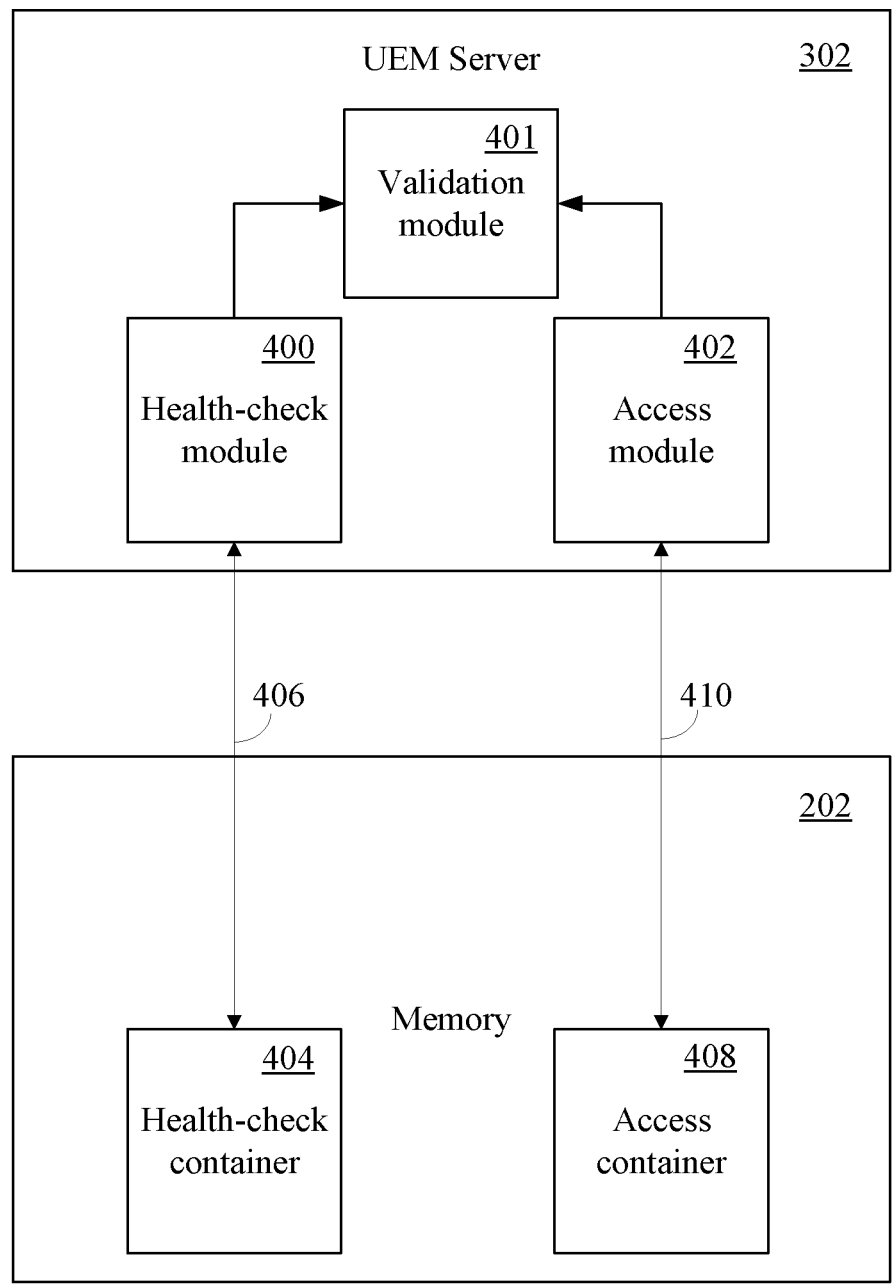
FIG. 4 shows an example of tunnel connections established between containers stored in memory of the computing device of FIG. 2 and a unified endpoint management (UEM) server of the enterprise network of FIG. 3.

As shown in FIG. 4, in this embodiment the UEM server 302 includes a validation module 401, a health-check module 400 and an access module 402. As will be described in more detail, the validation module 401 is configured to store cryptographic information, relationships between the instances of health-check containers and access-contains. The health-check module 400 is configured to provide a health-check status container 404 to memory 202 of the computing device 102 and to establish a tunnel connection 406 therewith. In this embodiment, the health-check status container 404 is unique and specific to the computing device 102. The tunnel connection 406 may be established using the Diffie-Hellman Key Exchange. The access module 402 is configured to provide an access container 408 to memory 202 of the computing device 102 and to establish a tunnel connection therewith 410. In this embodiment, the access container 408 is unique and specific to the computing device 102. The tunnel connection 410 may be established using the Diffie-Hellman Key Exchange. The tunnel connection 410 is independent from and employs a different keyset than the tunnel connection 406. Although not shown in FIG. 4, tunnel connections 406 and 410 are formed through the network 106 and firewall 108. As will be appreciated, the UEM server 302 may comprise multiple sub-servers such that the validation module 401, health-check module 400 and the access module 402 are located on different sub-servers, collectively referred to as the UEM server 302.

When stored in memory 202 of the computing device 102, the health-check status container 404 has read-only access to the computing device 102 and communicates with the health-check module 400 of the UEM server 302 via the tunnel connection 406. As will be appreciated, the computing device 102 does not have read or modify access to the health-check status container 404. The health-check status container 404 does not otherwise have access to the enterprise network 104. The health-check status container 404 is configured to check the health of the computing device 102. In this embodiment, the health of the computing device 102 is based on one or more indications of compromise which may be event based or may be determined through metadata. Examples of indications of compromise may be, for example, whether or not the computing device 102 is fully patched, has up-to-date antivirus software, has unmodified anti-malware software, based on the device manufacturer of the computing device 102, based on the device model of the computing device 102, based on the operating system (OS) of the computing device 102, based on whether or not the computing device 102 has been jailbroken, based on a firmware version of software or the OS of the computing device 102, based on a temperature history of the computing device 102, based on a battery drain history of the computing device 102, based on a modification or removal of applications installed on the computing device 102, based on applications persistently running on the computing device 102, based on known malicious applications installed on the computing device 102, based on applications installed on the computing device 102 acting or behaving suspiciously such as for example a flashlight application consuming network bandwidth, based on the computing device 102 being in a developer mode, based on multiple failed logins, based on a time since the last reboot of the computing device 102, based on connections the computing device 102 has to unknown physical hosts, based on evidence of physical tampering of the computing device 102, based on applications installed on the computing device 102 performing memory dumps, based on unusual boot sequence logs obtained from the computing device 102, based on concurrent logins from geographically separate locations of the computing device 102, etc. In this embodiment, the health-check status container 404 returns a health-check status of the computing device 102 to the health-check module 401, based on the security posture of the computing device 102. The health-check status may be one of pass, partial-pass and fail. As will be appreciated, the health-check status container 404 may additionally or alternatively provide metadata to the health-check module 400, indicating why the health-check status was achieved. The health-check status may be customizable based on the security posture. For example, in a high security application the default access may be set to no access, until multiple mandatory health-check statuses are evaluated and assessed. As another example, access to an emergency communication broadcast system from the network may always be permitted through the access container 408. Read-only access may be provided for patching or for other updates.

When stored in memory 202 of the computing device 102, the access container 408 communicates with the access module 402 of the UEM server 302 via the tunnel connection 410. The access module 402 provides the access container 408 with various levels of access to the enterprise network 104. The access container 408 is configured to adjust or throttle the level of access the computing device 102 has to the enterprise network 104 based on the health-check status thereof.

When stored in memory 202 of the computing device 102, the health-status container 404 and the access container 408 are fully segregated. The health-status container 404 and the access container 408 may be cryptographically related.

As mentioned previously, the validation module 401 is configured to store cryptographic information. In this embodiment, the validation module 401 stores cryptographic information and/or other metadata that uniquely identifies the health-check module 400/health-check container 404 and the access module 402/access container 408 such that the relationship between the health-check module 400/health-check container 404 and the access module 402/access container 408 has high integrity and trust. Further, storing the cryptographic information in the validation module 401 prevents other installations by the same user of the computing device 102 misrepresenting the health-status or granting inappropriate access levels to the wrong access container. The validation module 401 may be used to segregate and reconcile inventory information and provide assurance of the relationship between the health-check module 400/health-check container 404 and the access module 402/access container 408. The validation module 401 may be performed in a segregated process within the UEM server 302, or on a trusted and further segregated system.

Figure 5:
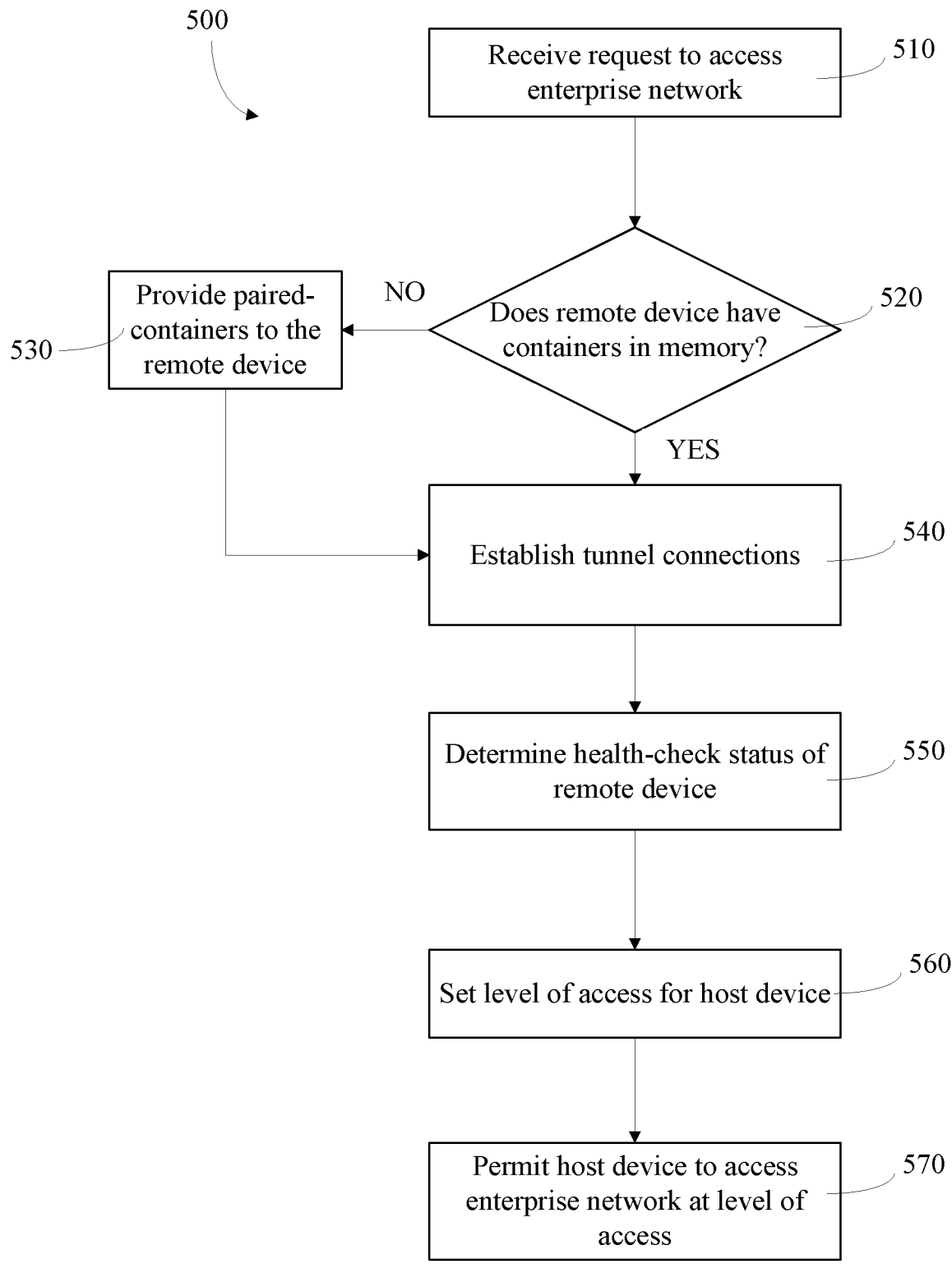
FIG. 5 shows, in flowchart form, one example method for providing access to the enterprise network.

The health-check module 400 and access module 402 communicate with one another within the UEM server 302 to allow the UEM server 302 to control a level of access the computing device 102 has to the enterprise network 104. An exemplary method executed by the UEM server 302 to control a level of access a computing device 102 has to the enterprise network 104 is shown in FIG. 5 and is generally identified by reference numeral 500. During the method, two segregated enterprise containers, namely the health-check status container 404 and the access container 408, establish separate tunnel connections, 406 and 410 respectively, with the UEM server 302. Since the health-check status container 404 has limited access to the enterprise network 104, the UEM server 302 can securely assess or evaluate the health of the computing device 102 before deciding what level of access to grant the computing device 102. As will be appreciated, the method 500 may be implemented through processor-executable instructions that, when executed by one or more processors associated with the UEM server 302, cause the processors to carry out the described operations.

During method 500, the UEM server 302 receives a request from the computing device 102 to access the enterprise network 104 (step 510). The request is received via network 106. The UEM server 302 determines if the computing device 102 has the health-check status container 404 and the access container 408 stored in its memory (step 520).

If the computing device 102 does not have the health-check status container 404 and the access container 408 stored in memory 202, then a specific pair of segregated but related containers are provided to the memory 202 of the computing device 102 (step 530). In this embodiment, the containers are provided to the memory 202 of the computing device 102 by communicating a download link to the computing device 102 which, when selected by a user of the computing device 102, downloads the containers into the memory 202 of the computing device 102 via network 106. The method then continues to step 540.

If, at step 520, the computing device 102 has the health-check status container 404 and the access container 408 stored in memory 202, the method continues to step 540.

As mentioned previously, the health-check status container 404 and the access container 408 are segregated within the memory 202 of the computing device 102.

The tunnel connections 406, 410 are established through the network 106 (step 540). Specifically, the tunnel connection 406 between the health-check status container 404 stored in memory 202 of the computing device 102 and the health-check status module 400 of the UEM server 302 and the tunnel connection 410 between the access container 408 stored in memory 202 of the computing device 102 and the access module 402 of the UEM server 302 are established.

The health-check status of the computing device 102 is determined by the health-check status container 404 (step 550). The health-check status container 404 may analyze the computing device 102 to determine if it has indications of compromise such as if it is fully patched, if it has up-to-date antivirus software, if it has unmodified anti-malware software or if it has other indications of compromise as described above. If the computing device 102 security posture is adequate for the configured requirements, the health-check status is set to pass. If the computing device 102 requires minor updates, the health-check status is set to partial pass. If the computing device 102 requires major updates or is deemed unsafe, the health-check status is set to fail. The health-check status container 404 then communicates the health-check status of the computing device 102 to the health-check module 400 of the UEM server 302.

The level of access for the computing device 102 is set based on the health-check status (step 560). In this embodiment, the health-check module 400 of the UEM server 302 communicates the health-check status of the computing device 102 to the validation module 401. The validation module 401 analyzes the health-check status to set a level of access for the computing device 102. If the health-check status is pass, the level of access for the computing device 102 is set at full access. If the health-check status is partial pass, the level of access for the computing device 102 is set at partial or limited access. If the health-check status is fail, the level of access for the computing device 102 is set at no access or limited access. If the health-check status is fail or partial-pass, an alarm may be raised and communicated to the UEM server 302, and optionally the user and/or administrator, indicating that an unsafe computing device has tried to access the network.

The level of access set by the validation module 401 of the UEM server 302 is communicated to the access module 402 stored in memory of the UEM server 302. Once received, the access module 402 permits the computing device 102 to access the enterprise network at the set level of access (step 570). For example, if the level of access is set at full access, then the computing device 102 is granted full access to the enterprise network based on a level of access granted to an access profile for the user of the computing device 102. For example, if the access profile of the user is a "Guest" then the user is granted full "Guest" access (which would be less than an "Employee" or an "Administrator"). In some instances, further granularity of access control could be implemented based on the roles that have been assigned to the user. If the level of access is set at partial or limited access, then the computing device 102 is granted partial or limited access to the enterprise network. The partial or limited access may be such that the computing device 102 is able to cure or update any indications of compromise that limited the access of the computing device 102. If the level of access is set at no access, then the computing device 102 may receive an indication that it has been refused access to the enterprise network and may further receive a report as to why it was refused access to the enterprise network.

Figure 6:
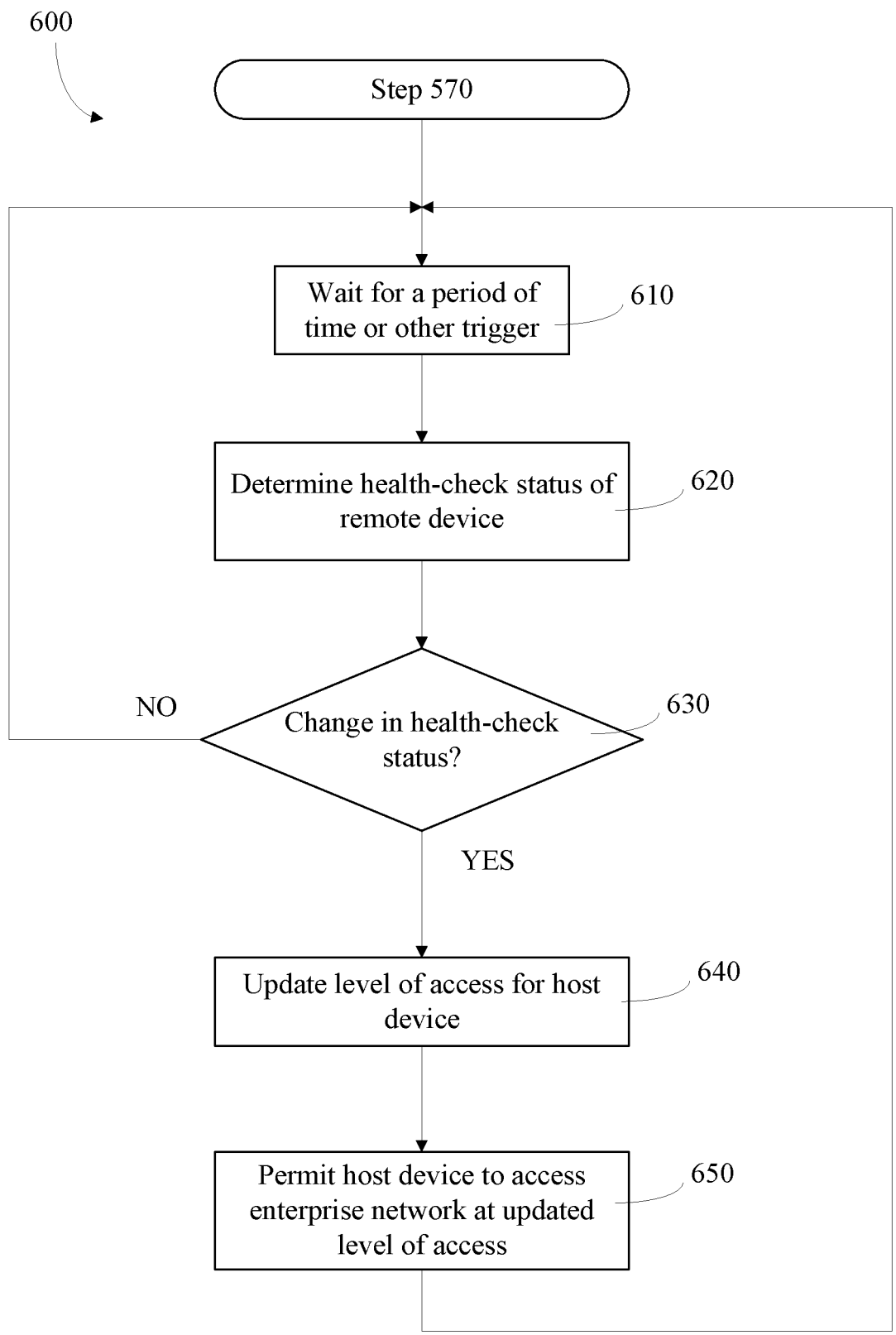
FIG. 6 shows, in flowchart form, one example method for periodically updating a level of access provided to a computing device.

Those skilled in the art will appreciate that the health-check status of the computing device 102 may be continuously or periodically monitored and the access level of the computing device 102 may be updated accordingly. An example is shown with reference to method 600 in FIG. 6. As can be seen, once the computing device 102 is permitted to access the enterprise network (step 570 of method 500), the UEM server 302 is configured to wait a predefined period of time (step 610). After the period of time, the health-check status of the computing device 102 is determined in a manner similar to that described above with reference to step 550 (step 620). A check is performed to determine if there has been a change in health-check status (step 630). Is there has not been a change in health-check status, the method returns to step 610 where the UEM server 302 is configured to wait a period of time and/or to wait for a trigger such as an indication of compromise. If there has been a change in health-check status, the level of access for the computing device 102 is updated in a manner similar to that described above with reference to step 560 (step 640). The computing device 102 accesses the enterprise network at the updated level of access (step 650) and the method returns to step 610.

In method 600, the level of access the computing device 102 has to the enterprise network can be updated or throttled if the health-check status changes. As one example, if, during method 500 the computing device 102 is granted partial or limited access to the enterprise network, this may allow the computing device 102 to install updates. Once the updates are installed, and after a period of time, the UEM server 302 may determine that the health-check status of the computing device 102 results in a pass. As a result, the level of access for the computing device 102 may be updated to full access. A message may be communicated and displayed by the computing device 102 indicating that the level of access has been changed.

As will be appreciated, in some of the above embodiments, by having a dedicated and separate health-check container, the UEM has increased assurance that the health-check container has not been tampered with. By providing read-only access to the computing device, the user has a greater sense of trust that their privacy is respected.

Although, during step 610 of method 600, the UEM server 302 is described as waiting a period of time before determining or updating the health-check status of the computing device 102, those skilled in the art will appreciate that alternatives are available. For example, in another embodiment, the UEM may determine if the health-check status of the computing device has changed if the computing device 102 indicates that it has installed updates, changed location by connecting to a different wireless access point, there has been a significant change in GPS location, lock/unlock status of the computing device, or other notable behavior modification or indication of compromise.

As mentioned previously, the UEM server 302 may comprise multiple sub-servers such that the validation module 401, health-check module 400 and access module 402 are located on different sub-servers. In this embodiment, the sub-server hosting the validation module, the sub-server providing access and the sub-server providing the health check may share a trusted authentication service. The sub-server comprising the health-check module 400 may run fewer services, resulting in a less vulnerable and thus more trusted state. Further, the sub-server comprising the health-check module 400 may be provided with more liberal access to the computing device 102 as the inspection comes from a more trustworthy source.

Although in embodiments the server is described as being a unified endpoint management (UEM) server, those skilled in the art will appreciate that other server or servers may be used. For example, another type of endpoint management and access gateway server may be used.

It will be appreciated that the various methods described above are presented in flowchart form to show a sequence of operations for ease of illustration and discussion, but that in some implementations a different sequence of operations may be used, additional operations may be included, and/or some operations shown sequentially may occur simultaneously or in parallel, without changing the substance of the processes.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of accessing a network, the method comprising:
   providing, via a first container establishing a first tunnel between a computing device and a network server, a health-check status of the computing device to the network server, the health-check status determined by the first container by analyzing the computing device to determine if the computing device has one or more indications of compromise; and
   accessing, via a second container establishing a second tunnel between the computing device and the network server, the network at a level of access based on the health-check status of the computing device,
   wherein the first and second containers are cryptographically related to one another and are segregated within memory of the computing device.

2. The method of claim 1, wherein the level of access to the network is determined by the network server.

3. The method of claim 1, comprising:
repeating the step of providing; and
updating the level of access if the health-check status of the computing device changes.

4. The method of claim 1, comprising:
sending, to the network server, a request to access the network.

5. The method of claim 4, comprising:
downloading, from the network server, the first and second containers into memory of the computing device.

6. The method of claim 5, further comprising:
receiving a download link from the network server that, when selected, downloads the first and second containers into memory of the computing device.

7. The method of claim 1, wherein the health-check status of the computing device is one of pass, partial pass and fail.

8. The method of claim 7, wherein the level is one of full access, limited access and no access based on an access profile for the user of the computing device.

9. The method of claim 8, wherein the level is set to full access when the health-check status of the computing device is pass.

10. The method of claim 8, wherein the level is set to limited access when the health-check status of the computing device is partial pass.

11. The method of claim 8, wherein the level is set to limited or no access when the health-check status of the computing device is fail.

12. The method of claim 1 wherein the first container has read-only access of the computing device.

13. The method of claim 1 wherein the second container has a minimum default access to the network.

14. A computing device comprising:
a processor;
a memory; and
processor-executable instructions that, when executed by the processor, cause the processor to:
provide, via a first container stored in the memory and establishing a first tunnel between the computing device and a network server, a health-check status of the computing device to the network server, the health-check status determined by the first container by analyzing the computing device to determine if the computing device has one or more indications of compromise; and
access, via a second container stored in the memory and establishing a second tunnel between the computing device and the network server, a network at a level of access based on the health-check status of the computing device,
wherein the first and second containers are cryptographically related to one another and are segregated within memory of the computing device.

15. The computing device of claim 14, wherein the processor-executable instructions, when executed by the processor, cause the processor to:
repeat the step of providing; and
update the level of access if the health-check status of the computing device changes.

16. The computing device of claim 14, wherein the health-check status of the computing device is one of pass, partial pass and fail.

17. The computing device of claim 14, wherein the level is one of full access, limited access and no access based on an access profile for the user of the computing device.

18. A non-transitory computer-readable storage medium storing processor-executable instructions that, when executed by a processor, cause the processor to:
provide, via a first container establishing a first tunnel between the computing device and a network server, a health-check status of a computing device to the network server, the health-check status determined by the first container by analyzing the computing device to determine if the computing device has one or more indications of compromise; and
access, via a second container establishing a second tunnel between the computing device and the network server, a network at a level of access based on the health-check status of the computing device,
wherein the first and second containers are cryptographically related to one another and are segregated within memory of the computing device.

* * * * *